United States Patent [19]

Somezawa et al.

[11] 4,396,674
[45] Aug. 2, 1983

[54] MAGNETIC RECORDING MEDIUM WITH AMINO LUBRICATING LAYER

[75] Inventors: Masashi Somezawa, Sendai; Shigeo Kimura, Tagajyo, both of Japan

[73] Assignee: Sony Corporation, Tokyo, Japan

[21] Appl. No.: 347,931

[22] Filed: Feb. 11, 1982

[30] Foreign Application Priority Data

Feb. 13, 1981 [JP] Japan .................... 56-19798

[51] Int. Cl.$^3$ .................. G11B 5/70; H01F 10/00
[52] U.S. Cl. .................... 428/341; 428/474.4; 428/475.2; 428/695; 428/900
[58] Field of Search ............ 428/695, 900, 341, 474.4, 428/475.2

[56] References Cited

U.S. PATENT DOCUMENTS 4,171,399 10/1979 Allen .................... 428/695
4,315,052 2/1982 Takahashi .................... 428/695

Primary Examiner—Marion McCamish
Attorney, Agent, or Firm—Hill, Van Santen, Steadman, Chiara & Simpson

[57] ABSTRACT

The magnetic recording media are constructed such that a lubricating layer containing an amine compound represented by the formula:

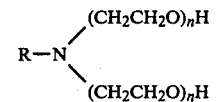

(wherein R is a hydrocarbon residue having from 7 to 21 carbon atoms and n is an integer ranging from 1 to 10) is disposed on at least one surface of a non-magnetic substrate with a magnetic layer. The magnetic recording media have an improved lubricating characteristics with a low friction coefficient.

7 Claims, 3 Drawing Figures

MAGNETIC RECORDING MEDIUM WITH AMINO LUBRICATING LAYER

BACKGROUND OF THE INVENTION

1. Field of the Invention

The present invention relates to a magnetic recording medium and, more particularly, to a magnetic recording medium on which a layer having an improved lubrication is formed.

2. Brief Description of the Prior Art

Magnetic recording media such as magnetic tapes require abrasion resistance because they are always travelling while in contact with a magnetic head or tape guides. Accordingly, they are required to have a low friction coefficient on their surfaces and not to cause stick-slip and noises. A stable travelling characteristics is also required for magnetic recording media. These characteristics are particularly necessary for video systems which require the prevention of adhesion or sticking that tend to be caused by environmental variations ranging from ambient temperatures and pressures to high operational temperatures and pressures.

In order to alleviate those drawbacks as involved in the conventional magnetic recording media, it has been proposed to provide a protective layer resulting from a lubricating agent such as waxes, paraffin or the like on the surface of the magnetic layer. The provision of such protective layer, however, cannot permit a sufficient solution to those drawbacks.

OBJECTS AND SUMMARY OF THE INVENTION

Therefore, an object of the present invention is to provide a magnetic recording medium having an improved lubrication.

Another object of the present invention is to provide a magnetic recording medium that has a low friction coefficient upon contact with a magnetic head and tape guides.

A further object of the present invention is to provide a magnetic recording medium which can travel to contact with the magnetic head and tape guides in a stable manner without causing adhesion and sticking.

In accordance with one aspect of the present invention, the magnetic recording medium has the structure of the type that a layer of a lubricating agent having an improved lubricating property is provided on at least one surface of the medium.

DETAILED DESCRIPTION OF THE PREFERRED EMBODIMENTS

The magnetic recording medium in accordance with the present invention comprises a non-magnetic substrate and a magnetic layer disposed thereon with a lubricating layer provided on at least one surface of the medium, said lubricating layer comprising an amine compound represented by the formula:

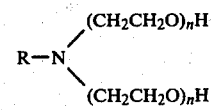

(wherein R is a higher hydrocarbon residue having from 7 to 21 carbon atoms and n is an integer ranging from 1 to 10.)

The term "higher hydrocarbon residue" referred to in the symbol R of the aforesaid formula throughout the specification may be a straight-chain or branched-chain, unsaturated or saturated, aliphatic higher hydrocarbon residue. The hydrocarbon residue represented by the symbol R may include an alkyl group such as, for example, heptyl group, octyl group, nonyl group, undecyl group, dodecyl group, hexadecyl group, heptadecyl group, eicosyl group, heneicosyl group, methylhexyl group, methylhexadecyl group, ethylheptadecyl group and the like and an alkenyl group such as, for example, heptenyl group, heptadecenyl group, ethylhexadecenyl group and the like.

Figure 1:
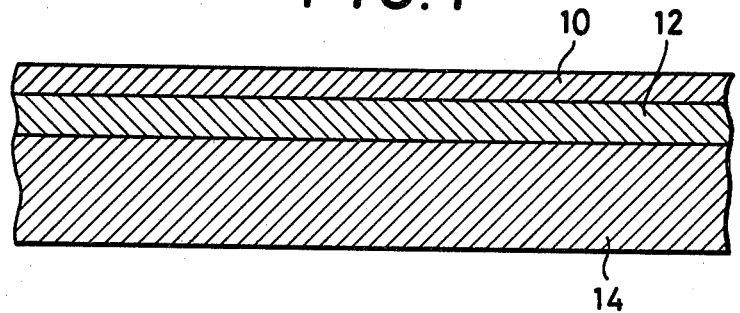
FIGS. 1 to 3 are each a cross sectional view illustrating an embodiment of the magnetic recording medium in accordance with the present invention.
Figure 2:
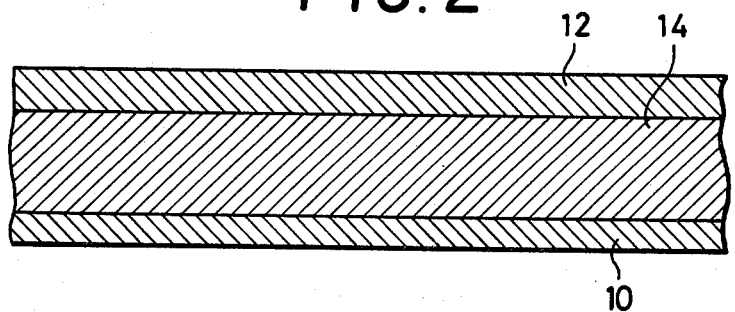
Figure 3:
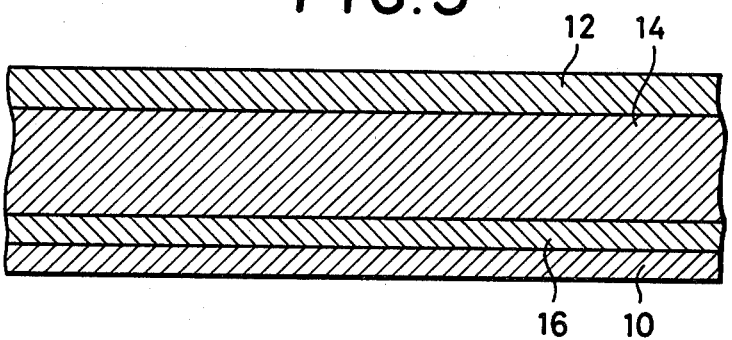

In accordance with the present invention, the lubricating layer may be provided on at least one surface of a non-magnetic substrate, for example, by coating or spraying thereon a solution of the aforesaid amine compound, singly or in admixture with each other, in a suitable solvent such as a fluorinated hydrocarbon, e.g., freon (trade name of E. I. duPont de Nemours & Co., Inc.) by a suitable means such as a roller. As shown in FIGS. 1 to 3, the lubricating layer 10 may be provided as a top coat (FIG. 1) for the magnetic layer 12 on the non-magnetic substrate 14 (FIG. 1) or as a back coat of the non-magnetic substrate 14 (FIG. 2) or as a top coat for the back-coating layer 16 (FIG. 3) that may be in turn provided for electrostatic prevention or for improving travelling characteristics. In embodiments where the lubricant comprising the amine compound as represented hereinabove is top-coated onto the magnetic layer, the lubricant layer is applied so that the amine compound is present preferably in the amount of about 1 to 1,000 milligrams per square meter of magnetic layer although the amount of the amine compound is not restricted to a particular one.

In accordance with the present invention, the magnetic layer of the magnetic recording medium to which the lubricating layer is applied may be of the type prepared by coating a mixture of magnetic or magnetizable powders with a binder on the surface of the non-magnetic substrate or of the type prepared by depositing a ferromagnetic metal such as cobalt by means of the vacuum deposition, sputtering or ion plating techniques.

The non-magnetic substrate to be used in accordance with the present invention may be of any known type comprising a flexible non-magnetic film base and a relatively rigid non-magnetic base. Those substrates may include, for example, polyesters such as polyethylene terephthalate, polyolefins such as polypropylene, cellulose derivatives such as cellulose diacetate and cellulose triacetate, polycarbonates, polyimides, metallic materials such as aluminum and copper, papers or any other suitable material.

The magnetic or magnetizable powders to be used in accordance with the present invention may be of any available magnetic or magnetizable materials such as gamma hematite (gamma-$Fe_2O_3$), magnetite ($Fe_3O_4$), iron oxides of non-stoichiometric oxidation compounds between gamma hematite and magnetite, gamma hematite or magnetite doped with non-ferrous atoms such as cobalt, chromium dioxide ($CrO_2$), barium ferrite, magnetic or magnetizable alloys such as an iron-cobalt alloy (Fe—Co), iron-nickel alloy (Co—Ni), iron-cobalt-nickel alloy (Fe—Co—Ni), iron-cobalt-boron alloy (Fe—Co—B), iron-cobalt-chromium-boron alloy (Fe—Co—Cr—B), manganese-bismuth alloy (Mn—Bi), manganese-aluminum alloy (Mn—Al) or iron-cobalt-vanadium alloy (Fe—Co—V), iron nitride, mixtures of the above or other magnetic or magntizable materials.

The binder to be used with the magnetic or magnetizable powders in accordance with the present invention may be any resinous binder and may include, for example, vinyl chloride-vinyl acetate copolymer, vinyl chloride-vinyl acetate-vinyl alcohol copolymer, vinyl chloride-vinyl acetate-maleic acid copolymer, vinyl chloride-vinyl propionate copolymer, vinyl chloride-vinyl propionate-vinyl alcohol copolymer, vinyl chloride-vinylidene chloride copolymer, vinyl chloride-acrylonitrile copolymer, acrylic acid ester-acrylonitrile copolymer, acrylic acid ester-vinylidene chloride copolymer, methacrylic acid ester-vinylidene chloride copolymer, methacrylic acid ester-styrene copolymer, thermoplastic polyurethane resin, phenoxy resin, polyvinyl fluoride, vinylidene chloride-acrylonitrile copolymer, acrylonitrile-butadiene-acrylic acid copolymer, acrylonitrile-butadiene-methacrylic acid copolymer, polyvinyl butyral, polyvinyl acetal, cellulose derivatives, styrene-butadiene copolymer, polyester resin, phenol resin, epoxy resin, thermosetting polyurethane resin, urea resin, melamine resin, alkyd resin, urea-formaldehyde resin, mixtures thereof or with other like resinous biders.

A reinforcement material capable of being used in the magnetic layer of the magnetic recording medium in accordance with the present invention may include, for example, aluminum oxide, chromium oxide, silicon oxide or mixtures thereof.

Magnetic recording media produced in accordance with the present invention may also contain an antistatic agent of the type that can be used with the magnetic recording media. An example of a suitable antistatic agent is finely divided carbon black. Furthermore, dispersing agents such as lecithin and the like may also be added to the magnetic layer of the magnetic recording medium in accordance with the present invention.

An organic solvent to be used with the magnetic or magnetizable particles or powders and the binder may include, for example, alcohols, such as methanol, ethanol, propanol and butanol; ketones such as acetone, methyl ethyl ketone, methyl isobutyl ketone and cyclohexanone; esters, such as methyl acetate, ethyl acetate, butyl acetate, ethyl lactate and glycol diacetate; ethers such as monoethyl ether; glycol ethers such as ethylene glycol monoethyl ether, ethylene glycol dimethyl ether and dioxane; aromatic hydrocarbons such as benzene, toluene and xylene; aliphatic hydrocarbons such as hexane and heptane; nitropropane; mixutures thereof or with other suitable organic solvents.

In embodiments where the amine compound represented by the aforesaid formula is employed in the back coat of the magnetic recording medium in accordance with the present invention, the back coat may comprise, for example, carbon such as furnace carbon, channel carbon, acetylene carbon, thermal carbon and lamp carbon, and inorganic pigments such as gamma-FeOOH, alpha-$Fe_2O_3$, $Cr_2O_3$, $TiO_2$, ZnO, SiO, $SiO_2.2H_2O$, $Al_2O_3.2SiO_2.2H_2O$, $3MgO.4SiO_2.H_2O$, $MgCO_3.Mg(OH)_2.3H_2O$, $Al_2O_3$ and $Sb_2O_3$.

It is advantageous during coating to use the amine compound represented by the aforesaid formula because it has a good dissolubility in a solvent because of a direct bonding of the hydrocarbon group to the amino group. The amine compound can permit no blooming after coating and a low abrasion providing a favorable surface on the surface of the magnetic recording media. Where the use of the amine compound having the formula where n is an integer lower than the lower limit is used, a hydrophilic property is rendered too high so that solubility is impaired to such as extent that it cannot be used in a stable manner. Where the number of carbon atoms for the hydrocarbon group represented by the symbol R is rendered too small, a decrease in friction coefficient is not achieved to a sufficient extent. Where the number of carbon atoms for the hydrocarbon group represented by the symbol R is rendered too high, a melting point of the compound is increased to such an extent that blooming is easily caused.

The present invention will now be described more in detail by way of wording examples.

EXAMPLE 1

A magnetic paint having the following composition was prepared as follows:

| Composition | Amount (Parts by Weight) |
| --- | --- |
| Co-doped gamma-$Fe_2O_3$ | 100 |
| Vinyl chloride-Vinyl acetate copolymer | 20 |
| Polyurethane resin | 10 |
| Lecithin | 2 |
| Carbon black | 5 |
| $Cr_2O_3$ | 3 |
| Methyl ethyl ketone | 150 |
| Toluene | 150. |

The mixture was ball milled to give the magnetic paint that was in turn coated on the surface of a polyethylene terephthalate film.

Lauryl diethanol amine was dissolved in freon (trade name of E. I. duPont de Nemours & Co., Inc.) to give a 1% solution. The solution was then coated on the surface of the magnetic layer of the resultant film so as to contain the amine compound in the amount of 50 mg per square meter and dried at ambient temperatures. The film was then cut into a given width and measured for its performance as a magnetic tape. The results are shown in a table below.

EXAMPLE 2

The procedures of Example 1 were followed with the exception that stearyl diethanol amine was used in place of lauryl diethanol amine to give a magnetic tape. The results for its performance as a magnetic tape are shown in a table below.

EXAMPLE 3

The procedures of Example 1 were followed with the exception that diheptaoxyethylene stearylamine, $C_{17}H_{35}$—$N[(CH_2CH_2O)_5H]_2$ was used in place of lauryl diethanol amine to give a magnetic tape. The tape was measured for its performance as a magnetic tape and the results are shown in a table below.

EXAMPLE 4

The procedures of Example 1 were followed to give a magnetic paint that was in turn coated in the surface of a polyethylene terephthalate film. The film was then coated on the other surface of the polyethylene terephthalate film with a back coat of carbon black.

A 1% freon solution of lauryl diethanol amine was then coated on the back coat so as to contain the amine compound in the amount of 60 mg per square meters and dried. The resultant tape was measured for its performance as a magnetic tape and the results are shown in a table below.

EXAMPLE 5

The procedures of Example 1 were followed to give a magnetic paint that was in turn coated on the surface of a polyethylene terephthalate film. A 0.1% freon solution of lauryl diethanol amine was coated on the other surface of the film so as to contain the amine compound in the amount of 2.5 mg per square meter and then dried. The magnetic tape was obtained in the same manner as in Example 1 and measured for its performance. The results are shown in a table below.

COMPARATIVE EXAMPLE 1

The procedures of Example 1 were followed with the exception that stearic acid was used in place of layryl diethanol amine to give a magnetic tape. It was then measured for its performance as a magnetic tape and the results are shown in a table below.

COMPARATIVE EXAMPLE 2

The procedures of Example 1 were followed with the exception that butyl stearate was used in place of layryl diethanol amine to give a magnetic tape. It was then measured for its performance as a magnetic tape and the results are shown in a table below.

COMPARATIVE EXAMPLE 3

Lauryl diethanol amine was added in the amount of 4 parts by weight to the composition of Example 1 to give a magnetic paint. The paint was coated on the surface of a polyethylene terephthalate film to give a magnetic layer, and the film was cut into a desired width to give a magnetic tape. Its performance is also shown in a table below.

TABLE

| | Performance As Magnetic Tape | | | |
|---|---|---|---|---|
| | Friction Coefficient | Durability Still (hrs) | Blooming | Q Sounds (audio tests) |
| Example 1 | 0.210 μd | 10–15 | good | good |
| Example 2 | 0.190 | 15–20 | " | " |
| Example 3 | 0.200 | 10–15 | " | " |
| Example 4 | 0.330 (prior to coating) 0.210 (after coating) | — | " | " |
| Example 5 | 0.270 (prior to coating) 0.200 (after coating) | — | " | " |
| Comparative Example 1 | 0.2 | none | fair | " |
| Comparative Example 2 | 0.7–0.8 | 15 | good | poor |
| Comparative Example 3 | 0.350 | 0.5 | " | fair |

It is apparent from the results of Table above that the magnetic recording media in accordance with the present invention have superior magnetic tape characteristics. The magnetic tape of Comparative Example 1 has favorable friction coefficient, blooming and Q sounds characteristics; however, durability was extremely low. The magnetic tape of Comparative Example 2 was very poor in friction coefficient and Q sounds. The magnetic tape of Comparative Example 3 did not provide favorable overall characteristics.

What is claimed is:

1. A magnetic recording medium comprising a non-magnetic substrate, a magnetic layer and a lubricating layer comprising an amine compound represented by the formula:

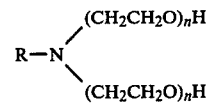

(wherein R is a higher hydrocarbon residue having from 7 to 21 carbon atoms and n is an integer ranging from 1 to 10).

2. The magnetic recording medium according to claim 1 wherein the lubricating layer is disposed on the magnetic layer formed on the surface of the non-magnetic substrate.

3. The magnetic recording medium according to claim 1 wherein the lubricating layer is disposed on the surface of the non-magnetic substrate with the magnetic layer disposed on the other surface thereof.

4. The magnetic recording medium according to claim 1 wherein the lubricating layer is disposed on the surface of a back coating layer formed on the surface of the non-magnetic substrate with the magnetic layer diposed on the other surface thereof.

5. The magnetic recording medium according to any one of claims 1 through 4 wherein the amine compound is contained in the amount ranging from about 1 to 1,000 mg per square meter in the lubricating layer.

6. The magnetic recording medium according to claim 5 wherein the amine compound is lauryl diethanol amine, stearyl diethanol amine or diheptaoxyethylene stearylamine.

7. The magnetic recording medium according to any one of claims 1 to 4 wherein the amine compound is lauryl diethanol amine, stearyl diethanol amine or diheptaoxyethylene stearylamine.

* * * * *